(12) United States Patent
Kato

(10) Patent No.: US 9,079,270 B2
(45) Date of Patent: Jul. 14, 2015

(54) FRICTION STIRRING AND JOINING APPARATUS, AND FRICTION STIRRING AND JOINING METHOD

(75) Inventor: Yoshinori Kato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 339 days.

(21) Appl. No.: 13/590,290

(22) Filed: Aug. 21, 2012

(65) Prior Publication Data
US 2013/0098526 A1 Apr. 25, 2013

(30) Foreign Application Priority Data
Oct. 19, 2011 (JP) .................................. 2011-229577

(51) Int. Cl.
B23K 20/12 (2006.01)

(52) U.S. Cl.
CPC ........... *B23K 20/1245* (2013.01); *B23K 20/122* (2013.01); *B23K 20/126* (2013.01); *B23K 20/1265* (2013.01); *B23K 2201/18* (2013.01)

(58) Field of Classification Search
None
See application file for complete search history.

(56) References Cited

U.S. PATENT DOCUMENTS

| | | | |
|---|---|---|---|
| 6,325,273 B1 * | 12/2001 | Boon et al. | 228/112.1 |
| 7,404,512 B2 * | 7/2008 | Baumann et al. | 228/44.3 |
| 2002/0190100 A1 * | 12/2002 | Duncan, Jr. | 228/112.1 |
| 2003/0057258 A1 * | 3/2003 | Ishida et al. | 228/104 |
| 2006/0102689 A1 * | 5/2006 | Trapp et al. | 228/2.1 |
| 2007/0246876 A1 * | 10/2007 | Wood et al. | 269/22 |
| 2009/0250505 A1 | 10/2009 | Matlack et al. | |
| 2011/0131784 A1 * | 6/2011 | de Traglia Amancio Filho et al. | 29/428 |
| 2012/0006883 A1 * | 1/2012 | Nishida et al. | 228/112.1 |
| 2013/0119115 A1 * | 5/2013 | Kato et al. | 228/112.1 |
| 2013/0255884 A1 * | 10/2013 | Baumann et al. | 156/538 |
| 2014/0069986 A1 * | 3/2014 | Okada et al. | 228/112.1 |
| 2014/0131424 A1 * | 5/2014 | Kato et al. | 228/103 |

FOREIGN PATENT DOCUMENTS

| | | |
|---|---|---|
| CN | 201603949 U * | 10/2010 |
| JP | 62-227588 | 10/1987 |
| JP | 3-106570 | 5/1991 |
| JP | 10-175089 | 6/1998 |
| JP | 10-305372 | 11/1998 |

(Continued)

OTHER PUBLICATIONS

Machine translation of CN-201603949U (no date available).*

(Continued)

*Primary Examiner* — Kiley Stoner
(74) *Attorney, Agent, or Firm* — Wenderoth, Lind & Ponack, L.L.P.

(57) ABSTRACT

A friction stirring and joining apparatus includes a tool holder; and pressing means provided ahead in a direction of joining by a tool held by the tool holder for pressing a junction surface of a workpiece. The pressing means includes a load imparting section that imparts a load toward the workpiece; a first abutting portion that is provided between the load imparting section and the tool held by the tool holder and abuts on the junction surface in the workpiece; a second abutting portion that is provided opposite the first abutting portion with respect to the load imparting section and abuts on the junction surface of the workpiece; and a supporting portion that is attached to the load imparting section and supports the first abutting portion and the second abutting portion.

12 Claims, 2 Drawing Sheets

(56) References Cited

FOREIGN PATENT DOCUMENTS

| | | |
|---|---|---|
| JP | 11-28582 | 2/1999 |
| JP | 11-226757 | 8/1999 |
| JP | 11-285829 | 10/1999 |
| JP | 2000-202645 | 7/2000 |
| JP | 2002-153983 | 5/2002 |
| JP | 2002-263864 | 9/2002 |
| JP | 2004-223557 | 8/2004 |
| JP | 2004-268178 | 9/2004 |
| JP | 2010-221236 | 10/2010 |
| KR | 2002-0009131 | 2/2002 |

OTHER PUBLICATIONS

Chinese Office Action issued Jun. 24, 2014 in corresponding Chinese Patent Application No. 201210327720.X (with English translation).
Japanese Notice of Allowance issued Mar. 25, 2014 in corresponding Japanese Application No. 2011-229577 with English translation.
Japanese Notice of Reasons for Rejection issued Sep. 17, 2013 in corresponding Japanese Patent Application No. 2011-229577 with English translation.

\* cited by examiner

FRICTION STIRRING AND JOINING APPARATUS, AND FRICTION STIRRING AND JOINING METHOD

Priority is claimed on Japanese Patent Application No. 2011-229577 filed on Oct. 19, 2011, the content of which is incorporated herein by reference.

BACKGROUND OF THE INVENTION

1. Field of the Invention

The present invention relates to a friction stirring and joining apparatus that performs friction stirring and joining on a workpiece.

2. Description of Related Art

Friction stirring and joining is known as one of the methods of joining a workpiece including two members. The friction stirring and joining makes a tool rotated in a state where a junction of the workpiece is pressurized by a predetermined pressurization force in a surface called a shoulder surface of the tool, thereby making frictional heat generated on a workpiece surface to soften the workpiece with this frictional heat to join the workpiece.

In such friction stirring and joining, a level difference, that is, unevenness may occur on the upper surfaces of abutted portions between joined members as the workpiece due to deformation of the workpiece when being formed, the heat deformation during the friction stirring and joining, or the like. When the friction stirring and joining is performed in a state where this unevenness has occurred, there is a possibility that poor joining, such as a tunnel-like cavity or a groove, may occur in a joining portion, thereby joining strength may deteriorate. For example, a technique of preventing occurrence of such poor joining is disclosed in Japanese Unexamined Patent Application, First Publication No. 2000-202645.

In the friction stirring and joining apparatus disclosed in JP-A-2000-202645, the friction stirring and joining is performed in a state where the unevenness that is a level difference between two joined members is made to fall within a predetermined range, while the end portion upper surfaces of the joined members are pressurized by a pressure roller on an extension in the advancing direction of a rotary tool. This pressure roller is formed such that a pressing shaft that supports the pressure roller is bent from a halfway position in the vertical direction so that a pressurizing portion is brought as close to the rotary tool as possible.

However, in the technique disclosed in Japanese Unexamined Patent Application, First Publication No. 2000-202645, if a strong joining pressure is made to act as the pressing shaft of the pressure roller is bent, a large moment is generated in this load imparting section, which may be damaged. Additionally, in a case where a high-rigidity material is used for the pressing shaft in order to prevent damage, a large rise in cost will be incurred.

The invention has been made in consideration of such circumstances, and an object thereof is to provide a friction stirring and joining apparatus that can suppress unevenness while controlling costs and preventing damage.

SUMMARY OF THE INVENTION

A friction stirring and joining apparatus related to the invention includes a tool holder; and pressing means provided ahead in the direction of joining by a tool held by the tool holder for pressing a junction surface of a workpiece. The pressing means has a load imparting section that imparts load toward the workpiece; a first abutting portion that is provided between the load imparting section and the tool held by the tool holder and abuts on the junction surface in the workpiece; a second abutting portion that is provided opposite the first abutting portion with respect to the load imparting section and abuts on the surface of the workpiece; and a supporting portion that is attached to the load imparting section and supports the first abutting portion and the second abutting portion.

In the above friction stirring and joining apparatus, moments act on the load imparting section from the first abutting portion and the second abutting portion when the workpiece is pressed. However, since the load imparting section is provided with the first and second abutting portions so that the load imparting section is positioned therebetween, the moments generated in the first abutting portion and the second abutting portion, respectively are mutually cancelled out. Accordingly, even in a case where the load imparting section imparts a large pressing force to the workpiece, damage of the load imparting section can be prevented, the first abutting portion of the pressing means can reliably press the junction surface of the workpiece, adjacent to the tool ahead in the direction of joining by the tool.

In the friction stirring and joining apparatus related to the invention, the supporting portion may be attached to the load imparting section so as to be rotatable around an axis orthogonal to the joining direction.

Since the supporting portion is made rotatable, in a case where there are irregularities on the surface of the workpiece, the supporting portion can move to follow the irregularities, and the junction surface can be reliably pressed.

In the friction stirring and joining apparatus related to the invention, the first abutting portion and the second abutting portion are rollers that are supported by the supporting portion so as to be rotatable around a rotating shaft orthogonal to the joining direction, and that form convex surfaces such that the outer peripheral surfaces thereof overhang radially outward in a direction along the rotating shaft.

Even in a case where the workpiece inclines in a direction along the rotating shaft by the rollers, the rollers can be reliably prevented from shouldering the workpiece, and pressing is reliably allowed while preventing damage of the workpiece.

The friction stirring and joining apparatus related to the invention may further include first cooling means for cooling the pressing means.

The first cooling means enables damage to the pressing means under the influence of heat generated with joining to be prevented, and enables joining to be performed while more reliably performing pressing.

In the friction stirring and joining apparatus related to the invention, the first cooling means may cool the first abutting portion of the pressing means.

Since this first abutting portion is arranged at the position of the pressing means that is nearest from the tool, the first abutting portions is apt to be influenced by heat. However, the pressing means can be more effectively performed by cooling the first abutting portion.

The friction stirring and joining apparatus related to the invention may further include second cooling means for cooling the junction surface at a position behind the tool, which is held by the tool holder, in the joining direction.

The second cooling means enables the heat of the junction to be rapidly removed after joining.

The friction stirring and joining apparatus related to the invention may further auxiliary pressing means provided behind the tool, which is held by the tool holder, in the joining direction, for pressing the junction surface of the workpiece.

The above auxiliary pressing means enables the workpiece to be pressed even behind the tool in the joining direction, and enables joining to be performed in a state where the workpiece is more reliably pressed.

The friction stirring and joining apparatus related to the invention may further include unevenness detection means for detecting unevenness of joined members constituting the workpiece between the first abutting portion and the tool held by the tool holder.

Since the unevenness generated between the joined members can be detected by the unevenness detection means, the pressing force of the pressing means can be changed depending on this unevenness, thereby performing joining while suppressing the unevenness, and joining strength can be further improved.

A friction stirring and joining method related to the invention performs joining of a workpiece, using a friction stirring and joining apparatus including a tool holder; and pressing means provided ahead in the direction of joining by a tool held by the tool holder, for pressing a junction surface of a workpiece, the pressing means having a load imparting section that imparts load toward the workpiece; a first abutting portion that is provided between the load imparting section and the tool held by the tool holder and abuts on the junction surface in the workpiece; a second abutting portion that is provided opposite the first abutting portion with respect to the load imparting section and abuts on the surface of the workpiece; and a supporting portion that is attached to the load imparting section and supports the first abutting portion and the second abutting portion. The method includes pressing the junction surface of the workpiece by the pressing means ahead the tool in the joining direction; and performing joining of the workpiece while maintaining the pressing of the workpiece by the pressing means.

The friction stirring and joining method related to the invention may further include cooling the pressing means.

The friction stirring and joining method related to the invention may further include cooling the junction surface of the workpiece.

The friction stirring and joining method related to the invention may further include pressing the junction surface of the work behind the tool in the joining direction.

The friction stirring and joining method related to the invention may further include detecting unevenness of joined members constituting the workpiece between the first abutting portion and the tool held by the tool holder.

In the friction stirring and joining method, the first abutting portion of the pressing means is adjacent to the tool ahead in the direction of joining by the tool and reliably presses the junction surface of the workpiece. Thus, control of unevenness is possible.

According to the friction stirring and joining apparatus and the friction stirring and joining method of the invention, the workpiece is pressed by the first abutting portion and the second abutting portion while achieving cost suppress and damage prevention of the pressing mean. Thus, joining can be performed while suppressing unevenness, and the joining strength of the workpiece can be further improved.

DETAILED DESCRIPTION OF THE INVENTION

A friction stirring and joining apparatus 1 related to an embodiment of the invention will be described below.

The friction stirring and joining apparatus 1 is an apparatus that joins a workpiece W by friction stirring and joining. Hereinafter, an example will be described in which joining end faces of a pair of plate-shaped joined members W1 are abutted in a workpiece W including the joined members W1, and are joined by the friction stirring and joining apparatus 1 from above in a state where the pair of joined members W1 is placed on a backing plate 19.

Figure 1:
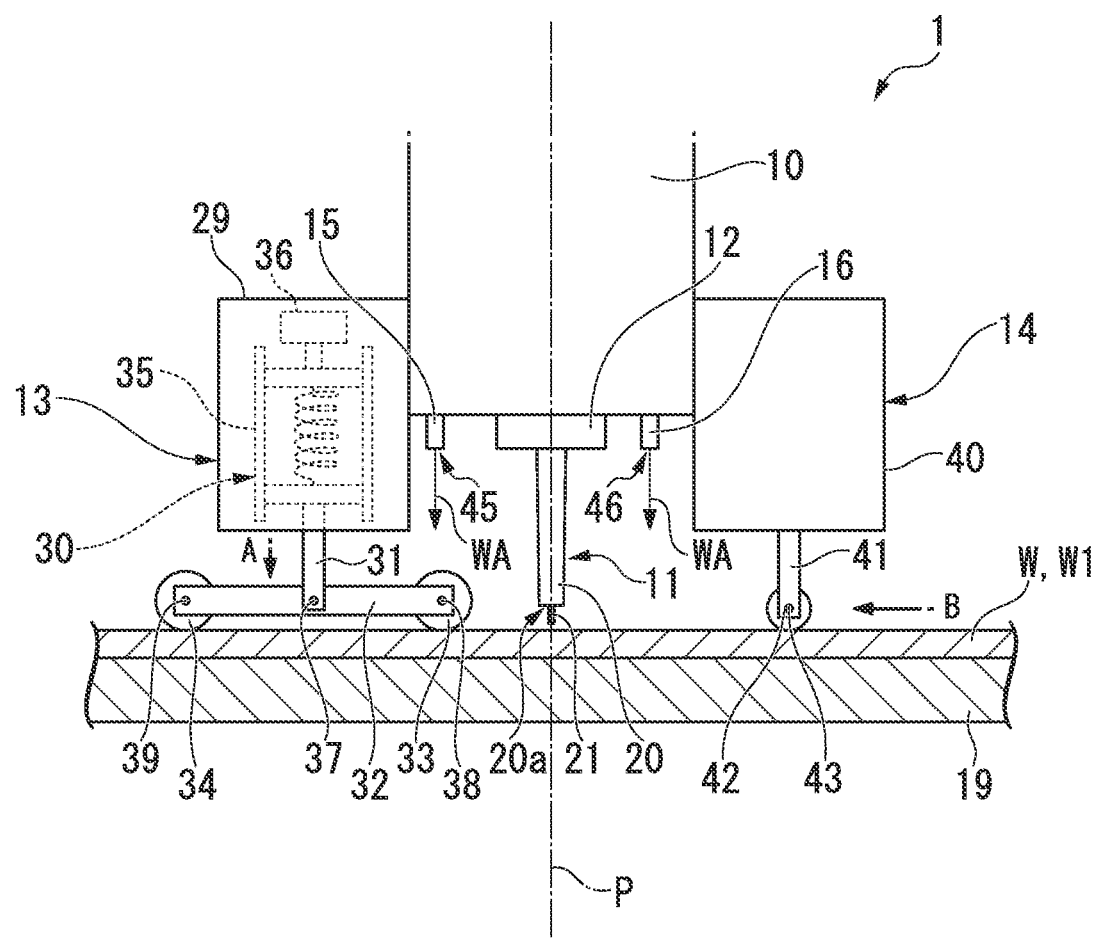
FIG. 1 is a side view showing the overall configuration of a friction stirring and joining apparatus related to an embodiment of the invention.

As shown in FIG. 1, the friction stirring and joining apparatus 1 includes a tool holder 12 that holds a tool 11 for performing joining, pressing means 13 and auxiliary pressing means 14 for pressing the joined members W1, first cooling means 15 for cooling the pressing means 13, and second cooling means 16 for cooling a junction.

In addition, a direction in which joining proceeds is defined as the joining direction, a direction along the surface of the workpiece W orthogonal to the joining direction is defined as an orthogonal direction, and a direction in which the tool 11 is inserted is defined as a height direction.

The tool 11 has a shoulder portion 20 and pin 21 that are formed around an axis P and are integral with each other.

The shoulder portion 20 assumes a columnar shape having the axis P as a center, and the lower end face of the shoulder portion 20 is formed as a shoulder surface 20a that is arranged on the surface side of the workpiece W and presses the surface.

The pin 21 has an outer shape formed smaller than the shoulder, assumes a columnar shape that protrudes from the center of the shoulder surface 20a downward in the height direction, and is inserted into the workpiece W during friction stirring and joining.

The tool holder 12 assumes a columnar shape having the axis P as a center, and holds the tool 11 so as to sandwich the shoulder portion 20 from the radial outside of the axis P at an upper end portion of the tool 11.

Additionally, the tool holder 12 has an upper end portion fixed to a lower end portion of the processing machine body 10, and, the tool holder 12 and the tool 11 are made movable in the height direction, the joining direction, and the orthogonal direction with the movement of the processing machine body 10. Moreover, the tool holder 12 and the tool 11 are made rotatable around the axis P with the rotation of a main shaft (not shown) in the processing machine body 10.

The pressing means 13 is provided ahead of the tool 11, which is held by the tool holder 12, in the joining direction, and presses a junction where the joined members W1 are joined.

The pressing means 13 has a pressing means body 29 attached to the processing machine body 10, a load imparting section 30 arranged within the pressing means body 29, a supporting portion 32 connected to a lower end portion of the load imparting section 30, and a first roller (first abutting portion) 33 and a second roller (second abutting portion) 34 that are provided at front and rear ends of the supporting portion 32 in the joining direction.

The pressing means body 29 is a member connected to the joining direction front side of the processing machine body 10, and has the load imparting section 30 that imparts load to the joined members W1 arranged therein. Additionally, a portion of the load imparting section 30 protrudes from a lower end of the pressing means body 29 in the height direction.

The load imparting section 30 is arranged within the pressing means body 29, and has a spring member 35 accommodated inside the pressing means body 29, a motor 36 that can adjust the pushing amount of the spring member 35, and a coupling portion 31 connected to a lower end of the spring member 35.

The coupling portion 31, which is a member that extends in the height direction, has an upper end connected to the spring member 35, and is made movable in the height direction by the motor 36. Additionally, the coupling portion 31 protrudes downward in the height direction from the pressing means body 29, has a lower end provided with a supporting portion rotating shaft 37 that has the orthogonal direction as an extending direction, and is connected to the supporting portion 32 via the supporting portion rotating shaft 37.

The supporting portion 32 is a member that is provided to sandwich the coupling portion 31 of the load imparting section 30 and extend symmetrically back and forth in the joining direction, and assumes a rectangular parallelepiped shape. Additionally, the supporting portion 32 is connected to the coupling portion 31 by the supporting portion rotating shaft (shaft) 37 at its central portion in the joining direction, and is made rotatable about the supporting portion rotating shaft 37.

Figure 2:
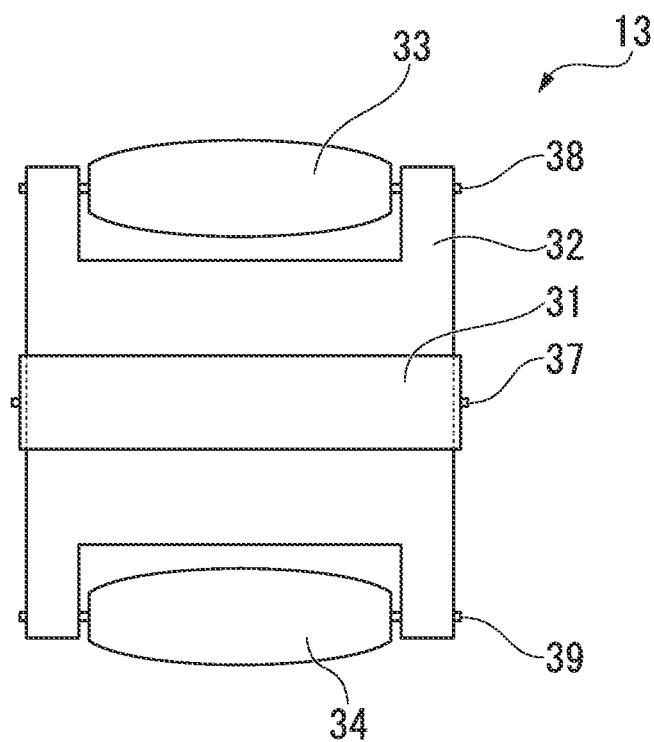
FIG. 2 is a view when pressing means of the friction stirring and joining apparatus related to the embodiment of the invention is viewed from above, wherein the view is seen in the direction of arrow A of FIG. 1.

As shown in FIG. 2, the first roller 33 is a roller member that is provided at a position adjacent to the tool 11 at the end portion of the supporting portion 32 in the joining direction, and that is made rotatable about the first roller rotating shaft 38 by the first roller rotating shaft (rotating shaft) 38 that has the orthogonal direction as the extending direction and a bearing (not shown). The outer peripheral surface of this first roller 33 is formed as a crown roll that overhangs outward in the radial direction of the first roller rotating shaft 38 along the extending direction of the first roller rotating shaft 38 that is the orthogonal direction, and that makes a convex curve of which the external diameter becomes the largest at the central portion in the extending direction.

The second roller 34 is formed as a crown roll that is provided at the end portion of the supporting portion 32 in the joining direction front side that is an end portion opposite the first roller 33 in the joining direction with the load imparting section 30 interposed therebetween, is made rotatable about the second roller rotating shaft 39 by the second roller rotating shaft (rotating shaft) 39 and a bearing (not shown), and that makes a convex curve of which the external diameter becomes the largest at the central portion in the extending direction, similar to the first roller 33.

Additionally, the first rollers 33 and the second roller 34 are arranged so as to abut on the surfaces of the joined members W1, and is made to be capable of changing a pressing force to the joined members W1 via the coupling portion 31 and the supporting portion 32 by the motor 36 and the spring member 35 of the load imparting section 30.

The auxiliary pressing means 14 is provided behind the tool 11 in the joining direction for pressing the junction.

The auxiliary pressing means 14 has an auxiliary pressing means body 40 connected to the processing machine body 10, a supporting portion 41 provided so as to protrude downward in the height direction from the auxiliary pressing means body 40, and an auxiliary roller 42 provided at a lower end portion of the supporting portion 41.

The auxiliary pressing means body 40 is a member connected to the rear side of the processing machine body 10 in the joining direction.

The supporting portion 41 is a member that is provided so as to protrude downward in the height direction of the auxiliary pressing means body 40 and that extends in the height direction, has a lower end provided with an auxiliary roller rotating shaft 43 that has the orthogonal direction as the extending direction, and is connected to the auxiliary roller 42 via the auxiliary roller rotating shaft 43.

Figure 3:
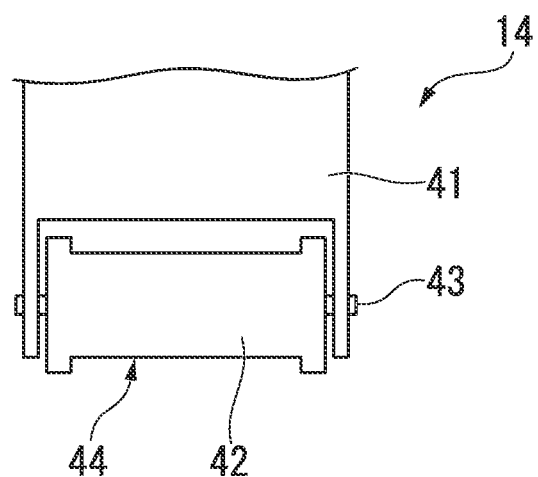
FIG. 3 is a view when auxiliary pressing means of the friction stirring and joining apparatus related to the embodiment of the invention is viewed from a joining direction, wherein the view is seen in the direction of arrow B of FIG. 1.

As shown in FIG. 3, the auxiliary roller 42 is a roller member that is connected at the lower end portion of the supporting portion 41 so as to be rotatable about the auxiliary roller rotating shaft 43 by the auxiliary roller rotating shaft 43 and a bearing (not shown), and is arranged so as to abut on the surfaces of the joined members W1. In the auxiliary roller 42, a cutout portion 44, which is recessed toward the inside from the radial outside along the extending direction of the auxiliary roller rotating shaft 43, is provided in the vicinity of a central portion in the extending direction of the auxiliary roller rotating shaft 43 that is the orthogonal direction, that is, a H-shaped cross-section is provided so as not to tread the junction.

The first cooling means 15 is disposed between the tool holder 12 and the pressing means body 29, and has a jetting port 45 that is provided to protrude from the lower surface of the processing machine body 10. The tip of the jetting port 45 are turned to the first roller rotating shaft 38 and the second roller rotating shaft 39 and their respective bearings, and are arranged so that cooling air WA blown in from a cooling means body (not shown) can be jetted to the first roller rotating shaft 38 and the second roller rotating shaft 39 and their respective bearings.

The second cooling means 16 similarly is disposed between the tool holder 12 and the auxiliary pressing means body 40, and has a jetting port 46 that is provided to protrude from the lower surface of the processing machine body 10. The tip of the jetting port 46 is arranged so that the cooling air WA blown in from the cooling means body (not shown) can be jetted to the junction between the surfaces of the joined members W1 behind the tool 11 in the joining direction.

In such a friction stirring and joining apparatus 1, the tool 11 is pressed against the junction between the joined members W1 and moves toward the front in the joining direction while rotating. In this case, the joined members W1 are joined while a junction surface ahead in the joining direction is pressed by the pressing means 13. Accordingly, the unevenness between the joined members W1 can be suppressed, occurrence of poor joining at the junction can be prevented, and joining strength can be improved.

Additionally, in the pressing means 13, the first roller 33 and the second roller 34 abut on the joined members W1, and perform pressing of the joined members W1. In this case, a counterclockwise moment acts on the coupling portion 31 in FIG. 1 by a reaction force that the first roller 33 receives from the joined members W1. On the other hand, a clockwise moment acts on the coupling portion 31 in FIG. 1 by a reaction force that the second roller 34 receives from the joined members W1.

Here, since the coupling portion 31 is provided with the first and second abutting portions 33 and 34 so that the coupling portion 31 is positioned therebetween, the moments that act on the above-described load imparting section 30 are mutually cancelled out, and the influence of the moments that act on the coupling portion 31 can be avoided.

Additionally, since the supporting portion rotating shaft 37 is rotatably connected to the coupling portion 31, the supporting portion 32 can follow irregularities of the surfaces of the joined members W1, and the surfaces of the joined members W1 can be more reliably pressed.

Additionally, even in a case where the surfaces of the joined members W1 inclines in the orthogonal direction by forming the first roller 33 and the second roller 34 of the pressing means 13 as the crown rolls, shouldering to the surfaces of the joined members W1 can be prevented, and surface contacting is allowed. Therefore, the surfaces of the joined members W1 can be pressed without being damaged, thereby reliably performing joining.

Additionally, since the auxiliary roller 42 of the auxiliary pressing means 14 has an H-shaped cross-section, the joined members W1 are pressed without treading on the joined junction, and lifting of the joined members W1 can be prevented even at the back in the joining direction. This leads to further improved quality of the junction.

The bearings of the first roller 33 and the second roller 34 can be prevented from being damaged due to heat during joining by the first cooling means 15, the durability of the pressing means 13 can be improved, and joining can be performed while reliably suppressing unevenness.

Moreover, the second cooling means 16 enables the junction after joining to be rapidly cooled.

In the friction stirring and joining apparatus 1 of the present embodiment, the first roller 33 and the second roller 34 of the pressing means 13 are provided at positions that are symmetrical in the joining direction along with positioning the coupling portion 31 between the first and second rollers 33 and 34. Therefore, it is not necessary to use a high-rigidity material even in a case where a large pressing force is required. For this reason, unevenness can be suppressed and joining can be performed, while preventing damage of the load imparting section 30 without incurring a large rise in cost.

Moreover, since the supporting portion 32 is rotationally supported by the supporting portion rotating shaft 37 with respect to the coupling portion 31, the first roller 33 and the second roller 34 are formed as the crown rolls, and the auxiliary pressing means 14 is adopted, the joined members W1 can be reliably pressed, occurrence of unevenness can be suppressed to prevent occurrence of poor joining, and joining strength can be improved.

Additionally, the heat of the pressing means 13 and the junction can be reliably removed by the first cooling means 15 and the second cooling means 16, the junction after joining can be rapidly cooled while reliably pressing the joined members W1, and joining strength can be further improved.

Although the embodiment of the invention has been described in detail, some design changes can also be made without departing from the technical idea of the invention.

For example, in a case where unevenness has occurred between the joined members W1, joining can be performed while more effectively suppressing unevenness by separately providing unevenness detection means for detecting this unevenness in advance, driving the motor 36 in the pressing means 13 corresponding to a detected value, and changing a pressing force.

As such unevenness detection means, it is possible to use an optical or ultrasonic displacement gage that can measure the positions of the joined members W1 in a height direction in non-contact, to detect unevenness from a difference in position in the height direction between the joined members W1.

Additionally, as an electric current is applied between this current application sensor and the joined members W1 when the position of the joined members W1 in the height direction becomes a predetermined value by using the current application sensor or the like, the positions in the height direction may be measured to detect the unevenness in contact.

Moreover, an uneven portion may be imaged by an imaging sensor or the like, and the size of the unevenness portion may be visually recognized to detect unevenness.

Additionally, in the present embodiment, the first roller 33 and the second roller 34 of the pressing means 13 are provided at symmetrical positions where the distances in the joining direction from the load imparting section 30 becomes equal, with the coupling portion 31 interposed therebetween. However, the distances in the joining direction may not necessarily become equal, and the rollers may be on the opposite sides in the direction with the coupling portion 31 interposed therebetween.

Additionally, the first roller 33 and the second roller 34 in the pressing means 13 may not be crown rolls.

Moreover, the spring member 35 provided inside the pressing means body 29 may be an actuator that operates by hydraulic pressure or pneumatic pressure. In a case where a pneumatic actuator is adopted, since compressed air as a working fluid, for example, a factory air that commonly used in plant facilities can be used, which leads to cost reduction.

Additionally, the first cooling means 15 and the second cooling means 16 are not necessarily installed, and the installation positions thereof are also not limited as long as the first roller rotating shaft 38, the second roller rotating shaft 39, the auxiliary roller rotating shafts 43, and their bearings can be cooled. Moreover, the refrigerant, it is not limited to the cooling air WA. The first cooling means 15 does not necessarily cool both the first roller rotating shaft 38 and the second roller rotating shaft 39, and may be arranged so as to cool only the first roller rotating shaft 38 that is easier to be influenced by the heat from the junction.

Moreover, the auxiliary pressing means 14 may not be installed, and this leads to cost reduction.

Additionally, the invention may be applied when joining is performed by using a bobbin tool, or the friction stirring and joining can also be applied to a spot FSW to be used for spot joining.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A friction stirring and joining apparatus comprising:
a tool holder; and
pressing means provided ahead in a direction of joining by a tool held by the tool holder, for pressing a junction surface of a workpiece,
wherein the pressing means includes:
a load imparting section that imparts a load toward the workpiece;
a first abutting portion that is provided between the load imparting section and the tool held by the tool holder and abuts on the junction surface in the workpiece at a position ahead of the tool;
a second abutting portion that is provided ahead of the first abutting portion with respect to the load imparting section and abuts on the junction surface of the workpiece; and a supporting portion that is attached to the load imparting section and supports the first abutting portion and the second abutting portion, wherein the supporting portion is attached to the load imparting section so as to be rotatable around an axis orthogonal to the direction of joining through a shaft member, and wherein the first abutting portion and the second abutting portion are supported by the supporting portion and provided opposite each other with respect to the shaft member in the direction of joining.

2. The friction stirring and joining apparatus according to claim 1, wherein the first abutting portion and the second abutting portion are rollers that form convex surfaces such that outer peripheral surfaces of the rollers overhang radially outward in a direction along the shaft member.

3. The friction stirring and joining apparatus according to claim 1, further comprising first cooling means for cooling the pressing means.

4. The friction stirring and joining apparatus according to claim 3, wherein the first cooling means cools the first abutting portion of the pressing means.

5. The friction stirring and joining apparatus according to claim 1, further comprising second cooling means for cooling the junction surface at a position behind the tool, which is held by the tool holder, in the direction of joining.

6. The friction stirring and joining apparatus according to claim 1, further comprising auxiliary pressing means provided behind the tool, which is held by the tool holder, in the direction of joining, for pressing the junction surface of the workpiece.

7. The friction stirring and joining apparatus according to claim 1, further comprising unevenness detection means for detecting unevenness of joined members constituting the workpiece between the first abutting portion and the tool held by the tool holder.

8. A friction stirring and joining method that performs joining of a workpiece, comprising:

using a friction stirring and joining apparatus including a tool holder; and pressing means provided ahead in a direction of joining by a tool held by the tool holder, for pressing a junction surface of a workpiece, the pressing means having a load imparting section that imparts a load toward the workpiece; a first abutting portion that is provided between the load imparting section and the tool held by the tool holder and abuts on the junction surface in the workpiece at a position ahead of the tool; a second abutting portion that is provided ahead of the first abutting portion with respect to the load imparting section and abuts on the junction surface of the workpiece; and a supporting portion that is attached to the load imparting section and supports the first abutting portion and the second abutting portion, wherein the supporting portion is attached to the load imparting section so as to be rotatable around an axis orthogonal to the direction of joining through a shaft member, and wherein the first abutting portion and the second abutting portion are supported by the supporting portion and provided opposite each other with respect to the shaft member in the direction of joining;

pressing the junction surface of the workpiece by the pressing means ahead of the tool in the joining direction; and performing joining of the workpiece while maintaining the pressing of the workpiece by the pressing means.

9. The friction stirring and joining method according to claim 8, further comprising cooling the pressing means.

10. The friction stirring and joining method according to claim 8, further comprising cooling the junction surface of the workpiece.

11. The friction stirring and joining method according to claim 8, further comprising pressing the junction surface of the workpiece behind the tool in the direction of joining.

12. The friction stirring and joining method according to claim 8, further comprising detecting unevenness of joined members constituting the workpiece between the first abutting portion and the tool held by the tool holder.

* * * * *